(12) United States Patent
Lee et al.

(10) Patent No.: US 9,715,277 B2
(45) Date of Patent: Jul. 25, 2017

(54) MOBILE TERMINAL

(71) Applicant: LG ELECTRONICS INC., Seoul (KR)

(72) Inventors: Haein Lee, Seoul (KR); Yoonji Moon, Seoul (KR); Egun Jung, Seoul (KR); Yongkyoung Shin, Seoul (KR); Jeehee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 568 days.

(21) Appl. No.: 14/217,630

(22) Filed: Mar. 18, 2014

(65) Prior Publication Data

US 2015/0020029 A1    Jan. 15, 2015

(30) Foreign Application Priority Data

Jul. 15, 2013 (KR) .................. 10-2013-0083051

(51) Int. Cl.
*G06F 3/048* (2013.01)
*G06F 3/01* (2006.01)
(Continued)

(52) U.S. Cl.
CPC ............ *G06F 3/016* (2013.01); *G06F 3/0485* (2013.01); *G06F 3/04883* (2013.01); *G06F 2203/04101* (2013.01); *G06F 2203/04803* (2013.01)

(58) Field of Classification Search
CPC .. G06F 3/0488; G06F 3/04883; G06F 3/0482; G06F 3/0481; G06F 9/4443
(Continued)

(56) References Cited

U.S. PATENT DOCUMENTS

2002/0067346 A1* 6/2002 Mouton ............. G06F 3/04886
                                                   345/173
2009/0195515 A1   8/2009 Lee ................................. 345/173
(Continued)

FOREIGN PATENT DOCUMENTS

CN        102439558 A    5/2012
CN        102591558 A    7/2012
(Continued)

OTHER PUBLICATIONS

Chinese Office Action dated Mar. 21, 2016 issued in Application No. 201410166551.5 (with English Translation.
(Continued)

*Primary Examiner* — Haoshian Shih
(74) *Attorney, Agent, or Firm* — Ked & Associates, LLP

(57) ABSTRACT

Disclosed is a mobile terminal for displaying at least one graphical user interface (GUI) on a standby screen, by which a graphic user interface for supporting interactions between a user and an operating program, an operating system or the like more smoothly can be efficiently displayed. The present disclosure includes a display unit configured to display a $1^{st}$ standby screen and a prescribed graphic user interface displayed on the $1^{st}$ standby screen and a controller, if a region of the $1^{st}$ standby screen displayed on the display unit is changed, controlling at least one of a display style and a display information of the prescribed graphic user interface displayed on the display unit to be changed based on the changed region of the $1^{st}$ standby screen.

18 Claims, 13 Drawing Sheets

(51) Int. Cl.
*G06F 3/0485* (2013.01)
*G06F 3/0488* (2013.01)

(58) Field of Classification Search
USPC .............. 715/765, 769, 783, 784, 815, 825; 345/173
See application file for complete search history.

(56) References Cited

U.S. PATENT DOCUMENTS

| | | | |
|---|---|---|---|
| 2012/0174026 A1* | 7/2012 | Shim | G06F 3/0488 715/784 |
| 2012/0246586 A1* | 9/2012 | Heo | G06F 3/0481 715/765 |
| 2013/0290887 A1* | 10/2013 | Sun | G06F 3/0482 715/769 |
| 2014/0096087 A1 | 4/2014 | Luan et al. | |
| 2015/0169211 A1 | 6/2015 | Shin et al. | |

FOREIGN PATENT DOCUMENTS

| | | |
|---|---|---|
| CN | 102710739 A | 10/2012 |
| CN | 103164121 A | 6/2013 |
| EP | 2 472 378 A2 | 7/2012 |
| WO | WO 2009/032638 A2 | 3/2009 |

OTHER PUBLICATIONS

Anonymous: "Widgets | Android Developers", Dec. 1, 2012 (Dec. 1, 2012), XP055149325, Retrieved from the Internet: https://web.archive.org/web/20121201014806/http://developer.android.com/design/patterns/widgets.html.

European Search Report issued in Application No. 14173261.0 dated Nov. 11, 2014.

* cited by examiner

FIG. 3A

| | | | | | |
|---|---|---|---|---|---|
| SUN | | 7 | 14 | 21 | 28 |
| MON | 1 | 8 | 15 | 22 | 29 |
| TUE | 2 | 9 | 16 | 23 | 30 |
| WED | 3 | 10 | 17 | 24 | 31 |
| THU | 4 | 11 | 18 | 25 | |
| FRI | 5 | 12 | 19 | 26 | |
| SAT | 6 | 13 | 20 | 27 | |

310

MOBILE TERMINAL

CROSS-REFERENCE TO RELATED APPLICATION

Pursuant to 35 U.S.C. §119(a), this application claims the benefit of earlier filing date and right of priority to Korean Application No. 10-2013-0083051, filed on Jul. 15, 2013, the contents of which are hereby incorporated by reference herein in their entirety.

BACKGROUND

1. Field

The present disclosure relates to a mobile terminal. Although the present disclosure is suitable for a wide scope of applications, it is particularly suitable for displaying at least one graphical user interface (hereinafter abbreviated GUI) on a standby screen.

2. Background

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

Beyond the stage of simply delivering audio, the technological developments of a mobile terminal enable various kinds of application programs to be installed on the mobile terminal to meet the demands of users and also enable the mobile terminal to use various data related to the installed application programs. And, the scope of the data can cover various fields including personal information (e.g., SMS (short message service) reception/transmission history, etc.) saved in the mobile terminal, self-created data (e.g., photo/video created using a camera loaded on the terminal, etc.), contents (e.g., an e-book downloaded from a server of a mobile communication service provider, picture friends, bell sounds, MP3, etc.) and the like. In this case, the mobile terminal may include one of a mobile communication terminal (i.e., a wireless terminal), a PDA (personal digital assistant), a PMP (portable multimedia player), and the like.

However, since several key inputs should be performed in order for a user to access a desired function or information through a mobile terminal, it is inconvenient for the user to use the mobile terminal. Moreover, if a user is not accustomed to terminal manipulations, it is difficult for the user to access necessary or desired information.

To solve the above-mentioned problems, a mobile terminal may be provided with a dedicated key for executing a specific function instantly. Yet, it is not realistic to install a multitude of dedicated keys for executing all functions necessary for a user on the mobile terminal. Besides, a dedicated key currently provided to a mobile terminal is limited to an execution of a specific function such as a digital broadcast reception, a camera, an MP3 player and the like.

To support and increase the functions of the mobile terminal, it may be able to consider the improvement of structural parts and/or software parts of the mobile terminal. In particular, a mobile terminal is provided with a user input unit configured to receive various types of inputs from a user.

A display unit of a mobile terminal tends to have a wider screen unit and higher resolution. As the display unit plays a role as a user input unit, many ongoing efforts are made to utilize the display unit for various functions. Recently, a graphic user interface capable of playing a role as a dedicated key on a display unit tends to be widely utilized.

Accordingly, embodiments of the present disclosure are directed to a mobile terminal that substantially obviates one or more problems due to limitations and disadvantages of the related art.

BRIEF DESCRIPTION OF THE DRAWINGS

The embodiments will be described in detail with reference to the following drawings in which like reference numerals refer to like elements wherein:

FIGS. 3A to 3C are diagrams of a plurality of standby screens of a mobile terminal according to one embodiment of the present disclosure;

DETAILED DESCRIPTION

Figure 1:
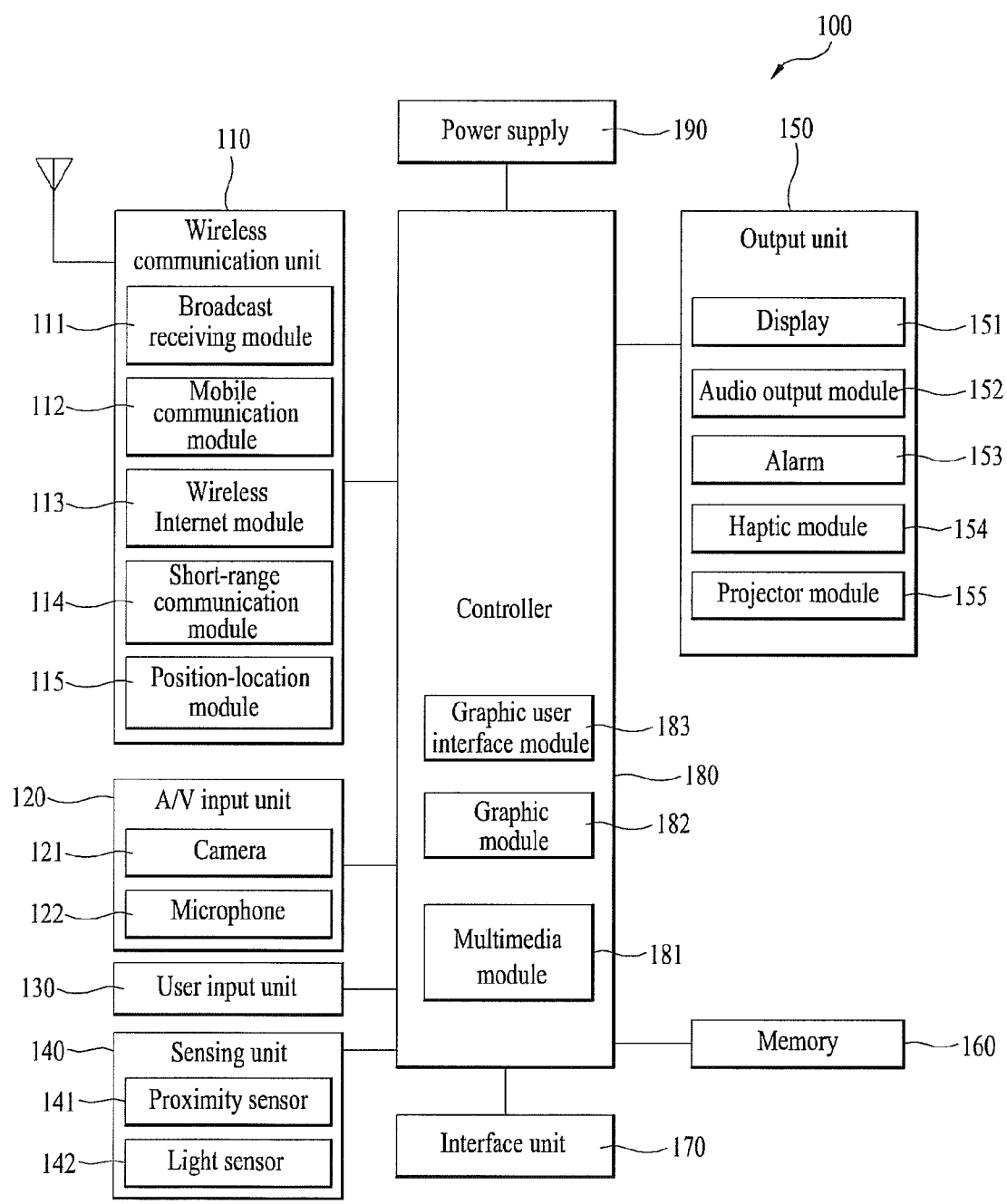
FIG. 1 is a block diagram of a mobile terminal according to one embodiment of the present disclosure.

In the following detailed description, reference is made to the accompanying drawing figures which form a part hereof, and which show by way of illustration specific embodiments of the disclosure. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

Recently, indicators, each of which has such an information display function as an alarm mode set by a user via a standby picture, a presence or non-presence of a reception of a text or voice message, a battery level and the like, and various kinds of graphic user interfaces, each of which is capable of executing a specific content, can be displayed on a display unit of a mobile terminal.

Owing to the above indicators or the graphic user interfaces, a user can be aware of a state of the mobile terminal without performing several key inputs to access a specific function or information via the mobile terminal. Moreover, the user touches a specific one of various graphic user interfaces displayed on the standby screen and is then facilitated to manipulate the mobile terminal in a manner of executing an application content corresponding to the touched point in direct.

In this case, an indicator generally indicates stationary information such as a setting of a mobile terminal, a reception status of the mobile terminal and the like. If a user uses a specific function of the mobile terminal, the indicator indicates that the corresponding function is in progress. The indicator is displayed on a fixed region of a screen of a display unit. If a user attempts to execute a specific function or change an operational status, a separate menu search or a separate setting function should be used. Therefore, the indicator is distinguished from a graphic user interface configured to execute a program.

A graphic user interface, which supports interactions between a user and an application program executed in a mobile terminal includes an icon representing a program or shortcut as a simple drawing or the like to execute one of various programs or a widget displaying real-time information on a display unit by performing a program independent from an operational state of the mobile terminal using a separate window.

First of all, an icon should be set to be arbitrarily displayed on a display unit screen to facilitate an execution of a frequently used function of a mobile terminal. And, a displayed position of the icon can be randomly designated. As the function set to correspond to the icon is executed, a display or operational state of an application in progress is normally changed on the display unit.

Meanwhile, a widget is one of graphic interfaces configured to smoothly support interactions between a user and an application program/operating system or the like. The widget enables a user to directly use a specific service on a standby picture within a terminal without visiting portal services or content providing sites one by one. For example of the information or service provided via the widget, there are such a state of a mobile terminal as a memory space, a remaining battery level and the like, a service of receiving such real-time information received externally as weather information, traffic information, MSN messenger, stock exchange information, keyword search window and the like.

Regarding the widget, a user initially installs a widget for providing a specific service in a terminal by accessing a corresponding site and is then able to use the corresponding service on a standby picture of the terminal via the widget without visiting the corresponding website.

In the following description, according to embodiments of the present disclosure, 'graphic user interface' conceptionally provides visual information via a display unit and also includes an application for executing each function provided by a mobile terminal and all applications downloaded externally. Moreover, it is understood that a graphic user interface is conceptionally discriminated from the above mentioned 'indicator'

As used herein, the suffixes 'module', 'unit' and 'part' are used for elements in order to facilitate the disclosure only. Therefore, significant meanings or roles are not applied to the suffixes themselves and it is understood that the 'module', 'unit' and 'part' can be used together or interchangeably.

However, by way of non-limiting example only, further description will be with regard to a mobile terminal 100, and it should be noted that such teachings may apply equally to other types of terminals.

FIG. 1 is a block diagram of a mobile terminal 100 in accordance with an embodiment of the present disclosure.

FIG. 1 shows the mobile terminal 100 according to one embodiment of the present disclosure includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

The proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm-unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the following description, when a displayed region of a standby screen, on which a prescribed graphic user interface is displayed, displayed on the display 151 is changed, controlling at least one of a display style and a display information of the prescribed graphic user interface displayed on the display 151 to be changed based on the changed region of the standby screen. Here, the controller 180 controls the standby screen to be moved in left/right direction based on a distance determined by the touch input, and controls the display 151 to display the moved standby screen.

Figure 2A:
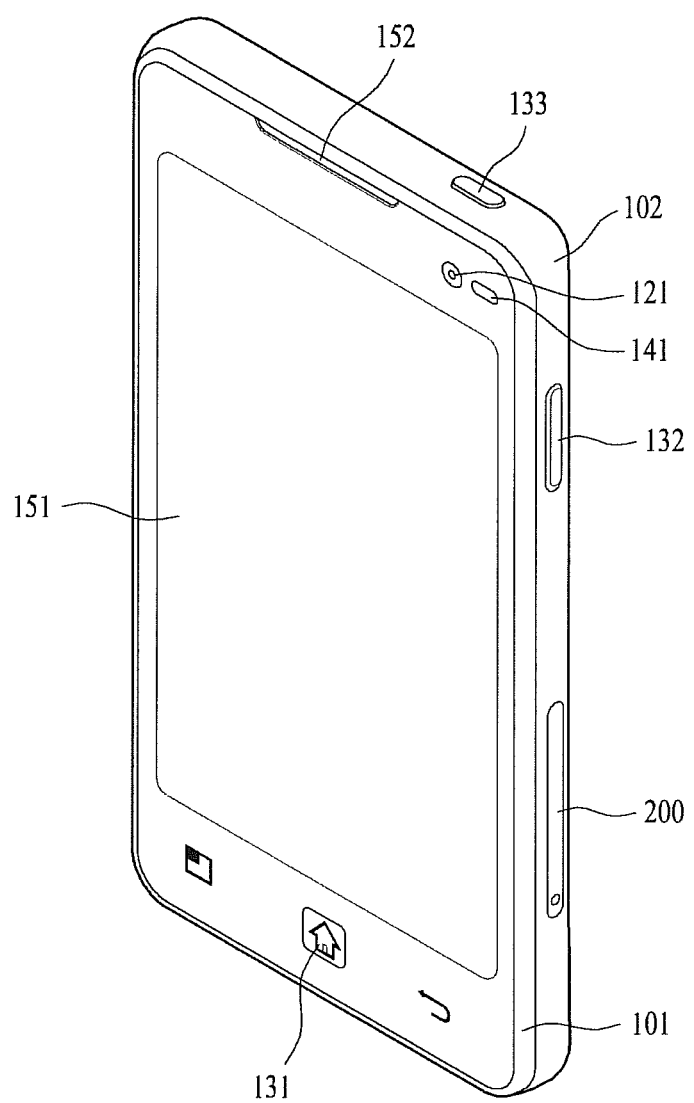
FIG. 2A and FIG. 2B are front and rear perspective diagrams of a mobile terminal according to one embodiment of the present disclosure, respectively.

FIG. 2A is a front perspective diagrams of a mobile terminal according to one embodiment of the present disclosure.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

The mobile terminal 100 includes a case 101, 102, 103 configuring an exterior thereof. In the present embodiment, the case can be divided into a front case 101 and a rear case 102. Various electric/electronic parts are loaded in a space provided between the front and rear cases 101 and 102.

Occasionally, the case can include an opening though which a detachable components such as an auxiliary storage 165, for example, a USIM card, a memory card and the like can be inserted. A slot can be provided at a side portion of the case or a surface of the rear case 102 though which the auxiliary storage 165 can be inserted and mounted.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the third manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

Figure 2B:
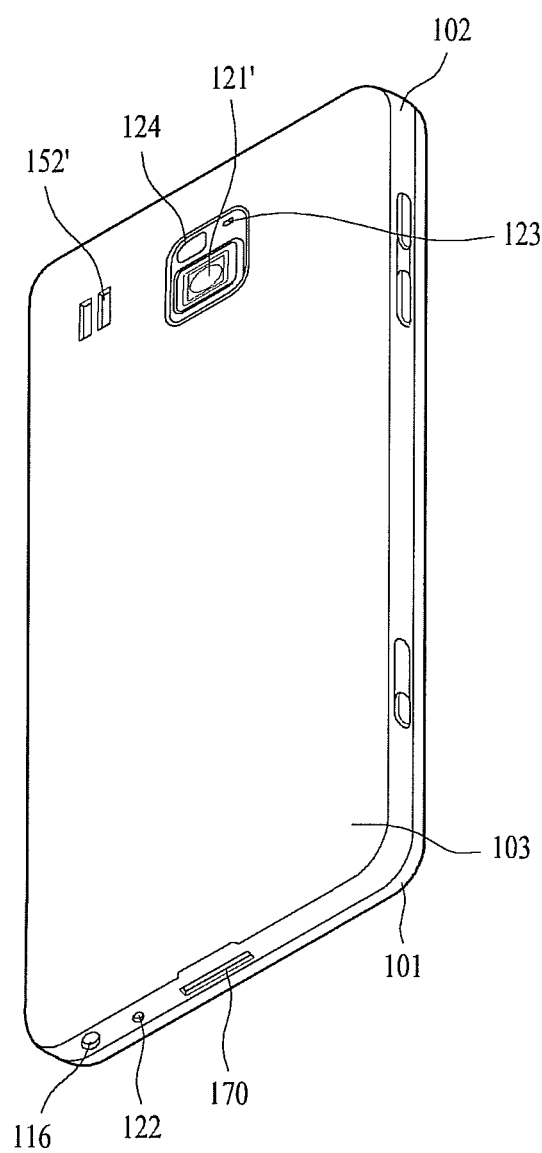

FIG. 2B is a rear perspective diagrams of a mobile terminal sown in FIG. 2A.

Referring to FIG. 2B, the camera 121' can be additionally provided to a backside of the terminal body, and more particularly, to the rear case 102. The camera 121 has a photographing direction that is substantially opposite to that of the former camera 121 shown in FIG. 1 and may have pixels differing from those of the firmer camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

The additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

Figure 3B:
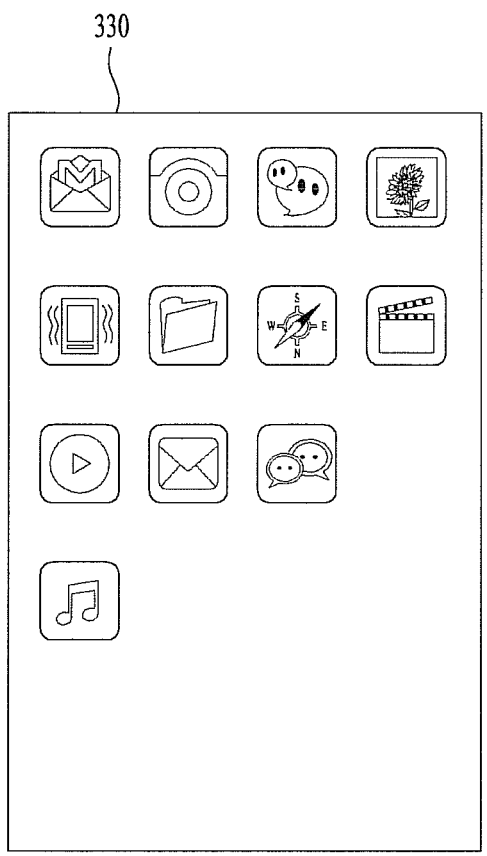
Figure 3C:

FIGS. 3A to 3C are diagrams of a plurality of preset standby screens of a mobile terminal according to one embodiment of the present disclosure.

Referring to FIGS. 3A to 3C, total 3 standby screens including 1st to 3rd standby screens 310, 330 and 350 are illustrated for example. In particular, a calendar widget is displayed as a graphic user interface on the 1st standby screen 310 and a plurality of icons are displayed as graphic user interfaces on the 2nd and 3rd standby screens 330 and 350. Standby screens may include various types of display screens including icon menu screens, lock screens, display screens for widgets or application, or another appropriate type of interface displayed on a mobile terminal.

A user of the mobile terminal 100 according to the present disclosure can control one of a plurality of the standby screens to be displayed on the display unit 151 through a prescribed user input unit 130 such as a touchpad and the like. In doing so, if the display unit 151 is used as the user input unit 130 and recognizes a user's touch, the user can control one of a plurality of the standby screens 310, 330 and 350 to be displayed on the display unit 151 by performing a touch input in a top-to-bottom direction on the display unit 151.

Figure 4:
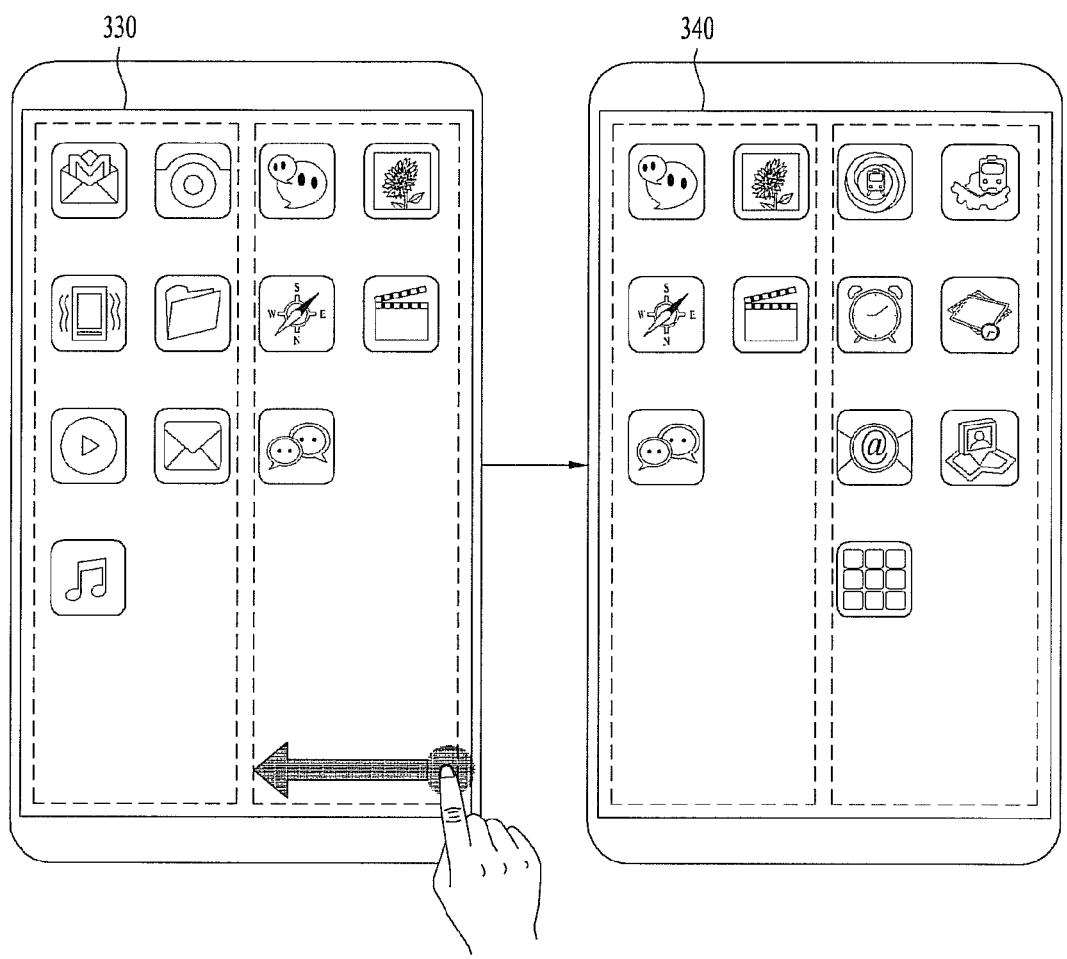
FIG. 4 is a diagram for one example of changing a standby screen according to one embodiment of the present disclosure.

FIG. 4 is a diagram for one example of changing a standby screen according to one embodiment of the present disclosure.

Referring to FIG. 4, while the $2^{nd}$ standby screen 330 is displayed on the display unit 151, if a user performs a touch by a prescribed distance in an arrow direction, the controller 180 can control the $2^{nd}$ standby screen 330 to be shifted on the display unit 151 by the corresponding distance in the arrow direction. In particular, a region for displaying the $2^{nd}$ standby screen 330 on the display unit 151 can be changed. So to speak, the controller 180 can control a portion of the $2^{nd}$ standby screen 330 and a portion of the $3^{rd}$ standby screen 350 neighbor to the $2^{nd}$ standby screen 330 to be displayed on the display unit 151. In doing so, the controller 180 determines whether the touch input attributed to the aforementioned touch is maintained for a prescribed duration. If the touch input is not maintained for the prescribed duration, the controller 180 can control either the $2^{nd}$ standby screen 330 or the $3^{rd}$ standby screen 350 to be displayed on the display unit 151. If the touch input is maintained for the prescribed duration, the controller 180 can control a new standby screen 340 including the portion of the $2^{nd}$ standby screen 330 and the portion of the $3^{rd}$ standby screen 350 to be created and displayed on the display unit 151. FIG. 4 shows one example that a half right region of the $2^{nd}$ standby screen 330 and a half left region of the $3^{rd}$ standby screen 350 are created as the new standby screen 340 as the touch input is shifted by a distance amounting to a half of a width of the standby screen, by which the present embodiment may be non-limited. For example, the standby screen is shifted by a distance amounting to a shifted distance of the touch input and then displayed on the display unit 151.

FIGS. 5 to 10 are diagrams for examples of changing a display style and information of a graphic user interface in response to a shift of a standby screen according to one embodiment of the present disclosure.

According to one embodiment of the present disclosure, as a prescribed standby screen is shifted right and left by a touch input, if a portion of the prescribed standby screen is displayed on the display unit 151, the controller 180 changes at least one of a display style and a display information of a graphic user interface located on the corresponding standby screen and then controls the graphic user interface having the changed display style and information to be displayed on the display unit 151.

Figure 5:
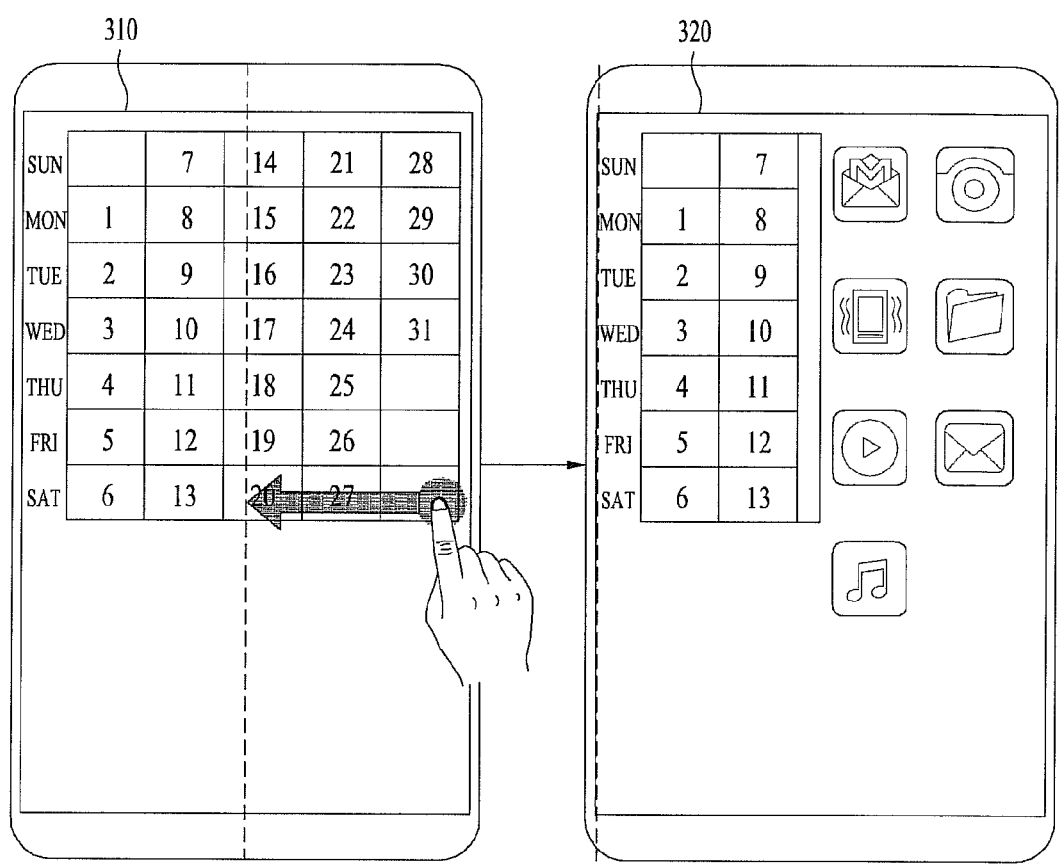
FIG. 5 and FIG. 6 are diagrams for one example of changing a display style and information of a calendar widget in response to a shift of a standby screen, in case that a graphic user interface is the calendar widget, according to one embodiment of the present disclosure.

In particular, FIG. 5 shows one example that a calendar widget is provided as a graphic user interface to the $1^{st}$ standby screen 310 on the left side. On the $1^{st}$ standby screen 310, dates amounting to a month are displayed as the calendar widget. In doing so, if a user performs a touch by a prescribed distance in an arrow direction, the controller 180 can shift the $1^{st}$ standby screen 310 on the display unit 151 by the corresponding distance in the arrow direction. In doing so, if the user performs a touch input in a left direction by a distance amounting to a half width of the $1^{st}$ standby screen 310, a new $4^{th}$ standby screen 320 having a region amounting to the half width of the $1^{st}$ standby screen 310 can be displayed on the display unit 151. If so, a region amounting to a right half of the $1^{st}$ standby screen 310 is displayed on a left part of the display unit 151 and a region amounting to a left half of the $2^{nd}$ standby screen 330 is displayed on a right part of the display unit 151. Yet, if the region amounting to the right half of the $1^{st}$ standby screen 310 is simply displayed on the display unit 151, dates less necessary for the user may be displayed on the display unit 151. Hence, the information necessary for the user can be displayed on the display unit 151. For instance, if a current date is $4^{th}$ day, the user can control a 2-week calendar corresponding to recent two weeks can be displayed on the display unit 151. For instance, if a size of the calendar widget displayed on the $1^{st}$ standby screen 310 is 4*4, the calendar widget in 2*4 size can be displayed on the $4^{th}$ standby screen 320 and its content can represent the information corresponding to the recent two weeks. In case that about ¼ of the $1^{st}$ standby screen 310 is shifted in left direction, a size of the calendar widget amounts to 3*4 and a calendar corresponding to recent 3 weeks is displayed on the display unit 151. In case that about ¾ of the $1^{st}$ standby screen 310 is shifted in left direction, the controller 180 can control the display unit 151 to display a calendar widget corresponding to recent 1 week in size 1*4. In particular, at least one of a display size, a display shape and a display information of the calendar widget can be changed depending on the region of the calendar widget located $1^{st}$ standby screen 310 displayed on the display unit 151.

Figure 6:
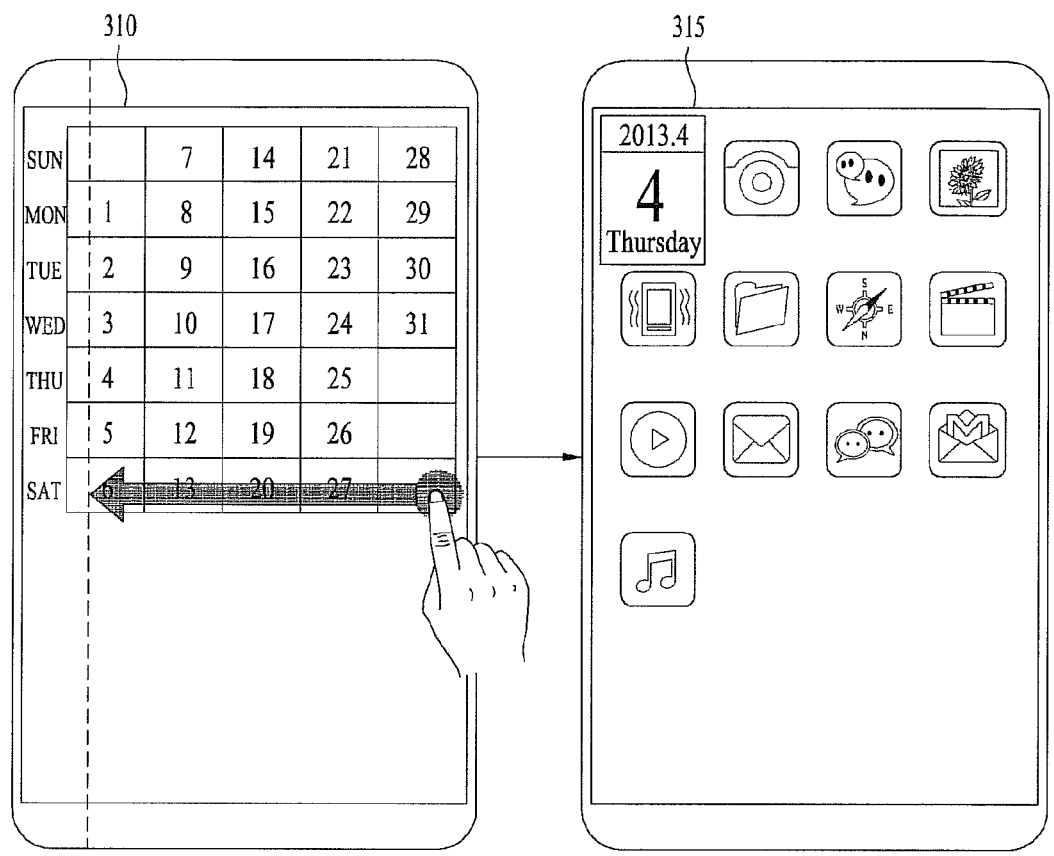

Besides, if the region of the $1^{st}$ standby screen 310 displayed on the display unit 151 is small, referring to FIG. 6, the controller 180 can control a current date to be displayed.

Meanwhile, in case that a graphic user interface located at the $1^{st}$ graphic user interface 310 is displayed on the newly created $4^{th}$ standby screen 320/315, the corresponding graphic user interface is preferably provided to a left part of the 4$^{th}$ standby screen 320/315, while a graphic user interface including icons, widgets and the like provided to the 2$^{nd}$ standby screen 330 is preferably provided to a right part of the 4$^{th}$ standby screen 320/315. Meanwhile, if a location of the corresponding graphic user interface overlaps a location of the icon provided to the 2$^{nd}$ standby screen 330, like the 4$^{th}$ standby screen 315 shown in FIG. 6, the graphic user interface located at the 1$^{st}$ standby screen 310 is provided to the left part and a location of the graphic user interface located at the 2$^{nd}$ standby screen 330 is preferably changed correspondingly. Yet, the graphic user interface located at the 2$^{nd}$ standby screen 330 is preferentially provided to the display unit 151. Subsequently, the graphic user interface located at the 1$^{st}$ standby screen 310 may be then provided to a vacant space or may not be displayed on the display unit 151 at all.

The memory 160 of the present disclosure can store graphic user interfaces in plural sizes. And, the controller 180 can determine which one of the graphic user interfaces in plural sizes will be displayed on the display unit 151 based on at least one of a size and shape of a region of a prescribed graphic user interface included standby screen displayed on the display unit 151.

According to one embodiment of the present disclosure, the controller 180 determines whether a touch input is maintained for a prescribed duration. If the touch input is maintained for the prescribed duration, the controller 180 creates the 4$^{th}$ standby screen 320/315 and can change a display style and a display information of a graphic user interface.

On the other hand, according to another embodiment of the present disclosure, while a portion of the 1$^{st}$ standby screen 310 is displayed on the display unit 151 irrespective of determining whether a touch input is maintained for a prescribed duration, the controller 180 can change a display style and a display information of a graphic user interface.

Figure 7:
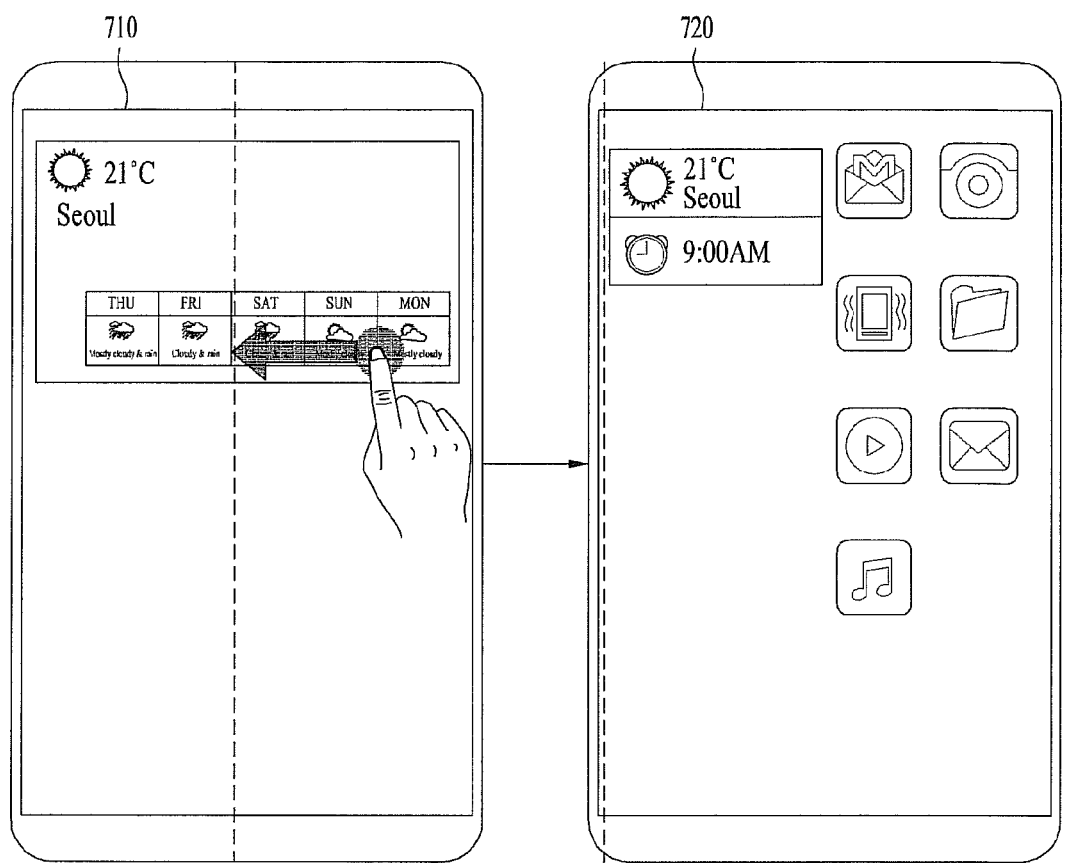
FIG. 7 and FIG. 8 are diagrams for one example of changing a display style and information of a weather widget in response to a shift of a standby screen, in case that a graphic user interface is the weather widget, according to one embodiment of the present disclosure.
Figure 8:
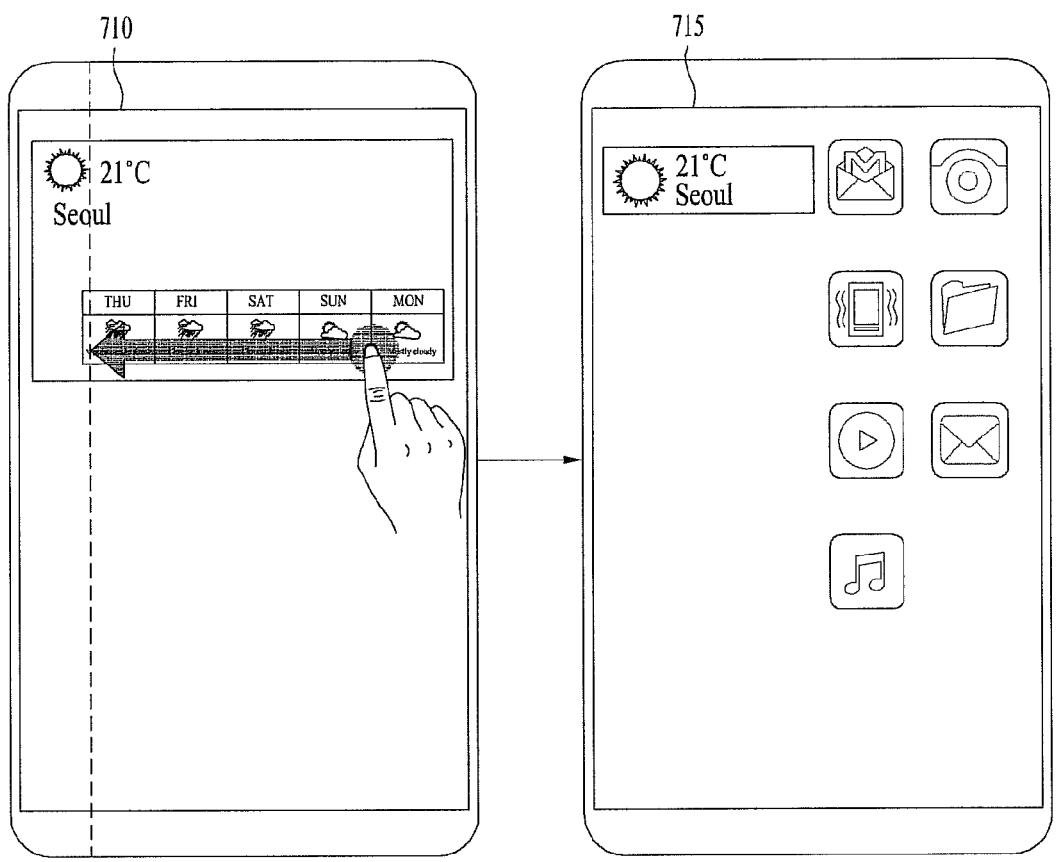

FIG. 7 and FIG. 8 are diagrams for one example of changing a display style and information of a weather widget in response to a shift of a standby screen, in case that a graphic user interface is the weather widget, according to one embodiment of the present disclosure.

In particular, FIG. 7 shows one example that a weather widget is provided as a graphic user interface to a 5$^{th}$ standby screen 710 on the left side. On the 5$^{th}$ standby screen 710, days amounting to recent 5 dates are displayed as a calendar widget. In doing so, if a user performs a touch by a prescribed distance in an arrow direction, the controller 180 can shift the 5$^{th}$ standby screen 710 on the display unit 151 by the corresponding distance in the arrow direction. In doing so, if the user performs a touch input in a left direction by a distance amounting to a half width of the 5$^{th}$ standby screen 710, a new 7$^{th}$ standby screen 720 having a region amounting to the half of the 5$^{th}$ standby screen 710 can be displayed on the display unit 151. If so, a region amounting to a right half of the 5$^{th}$ standby screen 710 is displayed on a left part of the display unit 151 and a region amounting to a left half of a 6$^{th}$ standby screen neighbor to the 5$^{th}$ standby screen 710 is displayed on a right part of the display unit 151. In this case, instead of the region amounting to the right half of the weather widget located at the 5$^{th}$ standby screen 510, weather information corresponding to recent two days or information on today's weather, hour and the like can be displayed on the display unit 151 in consideration of user's convenience. For instance, if a size of the weather widget displayed on the 5$^{th}$ standby screen 710 is 4*2, the size can be changed into 2*1, 2*2 or the like on the 6$^{th}$ standby screen 320 and the information displayed on the display unit 151 can be changed. Besides, in case that a region for displaying the 5$^{th}$ standby screen 710 on the display unit 151 further decreases, referring to FIG. 8, the controller 180 can further adjust at least one of a display style and a display content of the graphic user interface such as the weather widget displayed on the 7$^{th}$ standby screen 715. Meanwhile, in doing so, the controller 180 may control the display content to be changed without changing the display style of the graphic user interface.

As mentioned in the foregoing descriptions with reference to FIG. 5 and FIG. 6, the graphic user interface located at the 5$^{th}$ standby screen 710 is preferably provided to a left part of the 7$^{th}$ standby screen 720/715 and the graphic user interface located at the 6$^{th}$ standby screen neighbor to the right side of the 5$^{th}$ standby screen 710 is preferably provided to a right part of the 7$^{th}$ standby screen 720/715. If a location of the graphic user interface located at the 5$^{th}$ standby screen 710 and a location of the graphic user interface located at the 6$^{th}$ standby screen overlap each other, as mentioned in the foregoing descriptions with reference to FIG. 5 and FIG. 6, the controller 180 can control the location of each of the graphic user interfaces.

The memory 160 of the present disclosure can store graphic user interfaces corresponding to a weather widget in plural sizes. And, the controller 180 can determine which one of the graphic user interfaces in plural sizes will be displayed on the display unit 151 based on at least one of a size and shape of a region of a prescribed graphic user interface included standby screen displayed on the display unit 151.

According to one embodiment of the present disclosure, the controller 180 determines whether a touch input is maintained for a prescribed duration. If the touch input is maintained for the prescribed duration, the controller 180 creates the 7$^{th}$ standby screen 720/715 and can change a display style and a display information of a graphic user interface.

On the other hand, according to another embodiment of the present disclosure, while a portion of the 5$^{th}$ standby screen 710 is displayed on the display unit 151 irrespective of determining whether a touch input is maintained for a prescribed duration, the controller 180 can change a display style and a display information of a graphic user interface.

Figure 9:
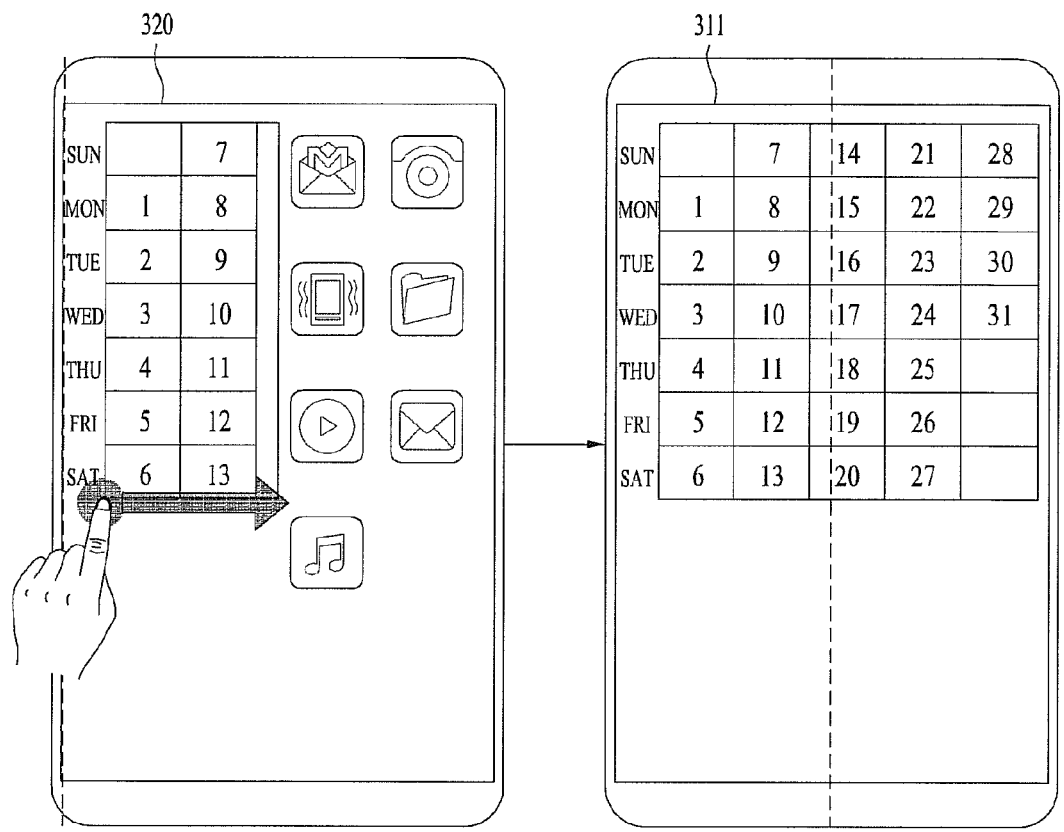
FIG. 9 is diagram for one example of a display style and information of a graphic user interface in case that a standby screen returns to a previous region before the shift after the display style and information of the graphic user interface have been changed in response to a shift of the standby screen according to one embodiment of the present disclosure.

FIG. 9 is diagram for one example of a display style and information of a graphic user interface in case that a standby screen returns to a previous region before the shift after the display style and information of the graphic user interface have been changed in response to a shift of the standby screen according to one embodiment of the present disclosure. And, FIG. 10 is diagram for one example of a display style and information of a graphic user interface in case that a standby screen returns to a previous region before the shift after the display style and information of the graphic user interface have been changed in response to a shift of the standby screen according to another embodiment of the present disclosure.

Referring to FIG. 5 and FIG. 9, as the 4$^{th}$ standby screen 320 is created, the display style and display information of the graphic user interface located at the 1$^{st}$ standby screen 310 can be changed. Thereafter, the 1$^{st}$ standby screen 311 can be displayed again on the display unit 151 in response to a user's touch input. In doing so, the controller 180 can control the display unit 151 in a manner that a graphic user interface having the same display content and information of the former 1$^{st}$ standby screen 310 is displayed on the re-displayed 1$^{st}$ standby screen 311.

Figure 10:
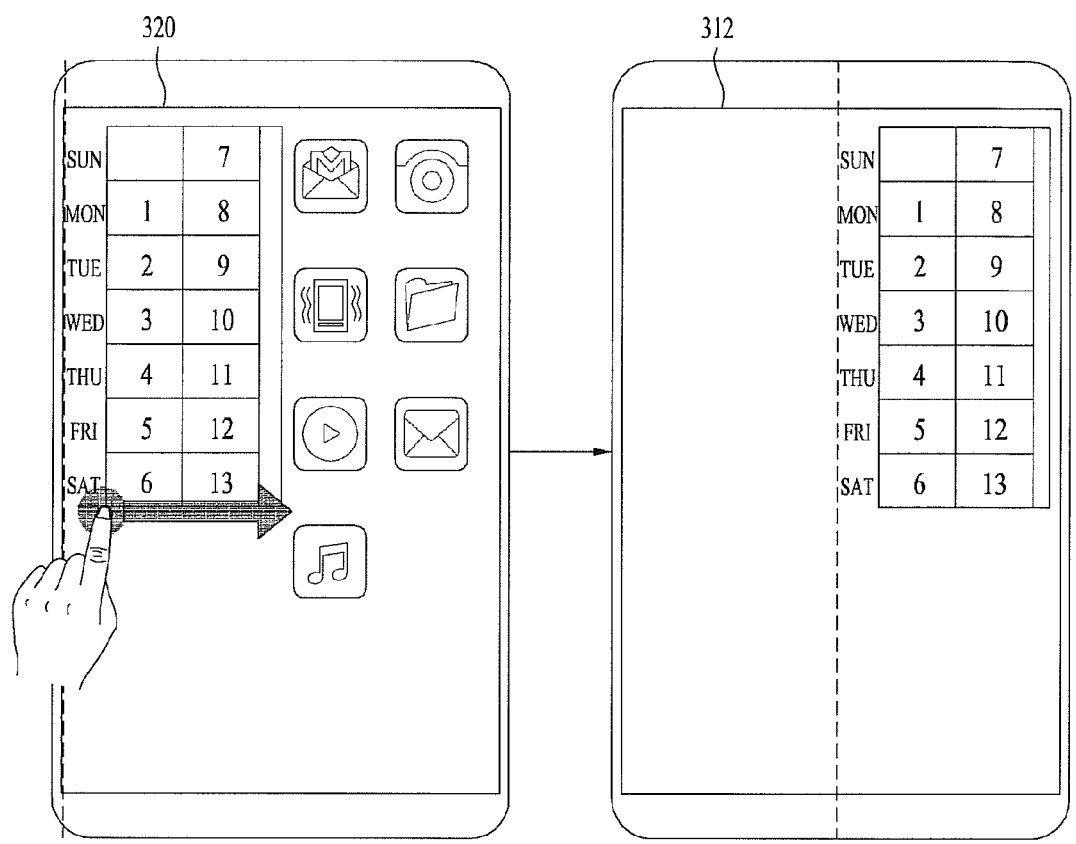
FIG. 10 is diagram for one example of a display style and information of a graphic user interface in case that a standby screen returns to a previous region before the shift after the display style and information of the graphic user interface have been changed in response to a shift of the standby screen according to another embodiment of the present disclosure.

According to another embodiment of the present disclosure, referring to FIG. 10, when the 1$^{st}$ standby screen 312 is redisplayed on the display unit 151 in response to a user's touch input, the controller 180 can control the display unit 151 to display a graphic user interface having a display content and information different from those of the former 1$^{st}$ standby screen 310. In particular, the controller 180 can control the display unit 151 in a manner that the graphic user interface having the display style and information displayed on the 4$^{th}$ standby screen 320 is displayed on the redisplayed 1$^{st}$ standby screen 312.

Meanwhile, according to one embodiment of the present disclosure, the controller 180 can control a window, which is provided to determine a mode for a user to create a new standby screen 315/320/340/715/720 with combination of preset standby screens as well as the preset standby screens 310, 330, 350 and 710, to be displayed on the display unit 151. And, the controller 180 can create the new standby screen 315/320/340/715/720 depending on whether the mode for creating the new standby screen 315/320/340/715/720 is set up by a user input.

According to one embodiment of the present disclosure, a plurality of graphic user interfaces located at a standby screen can have their display styles and informations changed entirely or in part based on a region of the standby screen displayed on the display unit 151. In doing so, if the display styles and informations of a plurality of the graphic user interfaces are changed in part, the changeable graphic user interface may preferably include a widget. The changeable graphic user interface may include at least one of a widget, a gadget and an icon, each of which size is greater than a preset size. And, the changeable graphic user interface may include a specific graphic user interface configured by a user.

According to one embodiment of the present disclosure, in case that the new standby screen 315/320/340/715/720 returns to the preset standby screen 310/330/350/710, the controller 180 controls a display window, which is provided to determine whether the graphic user interface having the display style and information changed in case of creating the new standby screen 315/320/340/715/720 is maintained or returns to the graphic user interface having the former display style and information before the change, to be displayed on the display unit 151. If the new standby screen 315/320/340/715/720 returns to the preset standby screen 310/330/350/710, the controller 180 can determine a display size and information of the graphic user interface.

It will be appreciated by those skilled in the art that the present disclosure can be specified into other form(s) without departing from the spirit or scope of the disclosures.

Embodiments of the present disclosure are directed to a mobile terminal that substantially obviates one or more problems due to limitations and disadvantages of the related art as previously discussed.

One object of the present disclosure is to provide a mobile terminal, by which a graphic user interface for supporting interactions between a user and an operating program, an operating system or the like more smoothly can be efficiently displayed.

Another object of the present disclosure is to provide a mobile terminal, by which a display style and/or a display information of a graphic user interface can be changed based on a region of a display unit having a prescribed graphic user interface located on a standby screen displayed on the display unit.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a mobile terminal according to the present disclosure may include a display unit configured to display a 1st standby screen and a prescribed graphic user interface displayed on the 1st standby screen and a controller, if a region of the 1st standby screen displayed on the display unit is changed, controlling at least one of a display style and a display information of the prescribed graphic user interface displayed on the display unit to be changed based on the changed region of the 1st standby screen.

Preferably, the prescribed graphic user interface may include a widget or a gadget.

Preferably, if the display style of the prescribed graphic user interface is changed, at least one of a size and a shape of the prescribed graphic user interface may be changed.

Preferably, the display unit may include a touchscreen configured to recognize a touch input and the controller may change the region of the 1st standby screen displayed on the display unit in response to the touch input applied to the touchscreen.

More preferably, the controller may control the 1st standby screen to be displayed on the display unit in a manner of being shifted in left or right direction by a distance of the applied touch input.

In this case, the display unit may further display a 2nd standby screen neighbor to the 1st standby screen and the controller may control the display unit to display a 3rd standby screen including a portion of the 1st standby screen and a portion of the 2nd standby screen in response to the touch input.

In this case, if each of the 1st standby screen and the 2nd standby screen includes a prescribed graphic user interface and the 3rd standby screen including the portion of the 1st standby screen and the portion of the 2nd standby screen is displayed on the display unit, the controller may control a display style and a display content of each of the prescribed graphic user interfaces to be changed.

In this case, the controller may determine whether the touch input is maintained for a prescribed duration. If the touch input is maintained for the prescribed duration after the 3rd standby screen has been displayed on the display unit, the controller may control the 3rd standby screen not to be displayed on the display unit until a separate touch input is applied. If the touch input is not maintained for the prescribed duration, the controller may change a screen displayed on the display unit into the 1st standby screen or the 2nd standby screen.

In this case, if a screen displayed on the display unit returns to the 1st, the controller may maintain the display style and the display information of the changed graphic user interface.

In this case, if a screen displayed on the display unit returns to the 1st, the controller may change the display style and the display information of the changed graphic user interface into the display style and the display information of the former graphic user interface before the change.

Accordingly, the present disclosure provides the following effects and/or advantages.

First of all, a mobile terminal configures various styles of standby screens in response to user's selections, thereby providing the user with convenience.

Secondly, the present disclosure changes a display style and information of a graphic user interface suitable for various standby screens, thereby efficiently displaying a user-desired information on a display without separate manipulations.

Thirdly, the present disclosure enables a user to set up whether to configure various standby screens, thereby diversifying user's selections and enabling the user to conveniently use the mobile terminal by configuring a standby screen in response to a user-desired mode.

Effects obtainable from the present disclosure may be non-limited by the above mentioned effect. And, other unmentioned effects can be clearly understood from the following description by those having ordinary skill in the technical field to which the present disclosure pertains.

It is to be understood that both the foregoing general description and the following detailed description of the present disclosure are exemplary and explanatory and are intended to provide further explanation of the disclosure as claimed.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display configured to display a first standby screen and a prescribed graphical user interface displayed on the first standby screen; and
a controller configured to control display of the first standby screen and the prescribed graphical user interface,
wherein, when a display region in which the first standby screen displayed on the display is changed, at least one of a display style or displayed information of the prescribed graphical user interface is changed based on the change to the display region of the first standby screen,
wherein the display includes a touchscreen configured to recognize a touch input,
wherein the display region of the first standby screen displayed on the display is changed in response to the touch input applied to the touchscreen, and
wherein the display region of the first standby screen is changed in a manner of being shifted to the left or right on the display by a distance corresponding to the applied touch input,
wherein a plurality of display screens are configured to be sequentially displayed on the touchscreen in response to a gesture input with the touchscreen,
wherein a duration of the gesture input is determined, and
when the duration of the gesture input is less than a prescribed duration, the first standby screen is moved to be replaced by a subsequent display screen, and
when the duration of the gesture input is greater than or equal to the prescribed duration, a size of the display region of the first standby screen is changed and the prescribed graphical user interface is displayed concurrently with a graphical user interface for the subsequent display screen.

2. The mobile terminal of claim 1, wherein the prescribed graphical user interface includes at least one of a widget or a gadget.

3. The mobile terminal of claim 1, wherein, when the display style of the prescribed graphical user interface is changed, at least one of a size, a shape or content of the prescribed graphical user interface is changed.

4. The mobile terminal of claim 1, wherein the display further displays a second standby screen adjacent to the first standby screen, and wherein the display is controlled to display a third standby screen that includes a portion of the first standby screen and a portion of the second standby screen in response to the touch input.

5. The mobile terminal of claim 4, wherein, when the third standby screen including the portion of the first standby screen and the portion of the second standby screen is displayed on the display, at least one of a size, a shape or content of corresponding graphical user interfaces of each of the first and second standby screens is changed.

6. The mobile terminal of claim 4, wherein a prescribed duration of the touch input is determined, and when the touch input is maintained at least for the prescribed duration, the display of the third standby screen is maintained on the display, and when the touch input is not maintained for the prescribed duration, either the first standby screen or the second standby screen is displayed in response to the touch input.

7. The mobile terminal of claim 4, wherein, when the display region for first standby screen is restored to a state prior to the change, the display style and the display information of the graphical user interface is maintained in the changed state.

8. The mobile terminal of claim 4, wherein, when the display region for the first standby screen is restored to a state prior to the change, the display style and the display information of the graphical user interface is reverted to a state prior to the change.

9. The mobile terminal of claim 1, wherein the prescribed graphical user interface includes a calendar widget, and wherein the changed at least one of the displayed style or displayed information includes a change in dates which are displayed for the calendar widget based on the change in the display region of the first standby screen.

10. The mobile terminal of claim 9, wherein when the size of the display region of the first standby screen is decreased, a size of the displayed dates is decreased.

11. A mobile terminal comprising:
a display configured to display a plurality of display screens having corresponding graphical user interfaces; and
a controller configured to control display of the plurality of display screens and configuration of the corresponding graphical user interfaces,
wherein a first display screen having a first graphical user interface is displayed in a first region of the display, the first graphical user interface having a first configuration, and
in response to an input, a size of the first region is changed according to the input, the display of the first display screen is changed to correspond to the changed size of the first region, and the first graphical user interface is changed from the first configuration to a second configuration that is different than the first configuration,
wherein the controller is further configured to determine which one of the graphic user interfaces in plural sizes will be displayed on the display based on at least one of a size and shape of a region of a prescribed graphic user interface included in the display screen displayed on the display,
wherein the display is a touchscreen and the plurality of display screens are configured to be sequentially displayed on the touchscreen in response to a gesture input with the touchscreen,
wherein a duration of the gesture input is determined, and
when the duration of the gesture input is less than a prescribed duration, the first display screen is moved to be replaced by a subsequent display screen, and
when the duration of the gesture input is greater than or equal to the prescribed duration, the size of the first region is changed and the first graphical user interface is displayed concurrently with a graphical user interface for the subsequent display screen.

12. The mobile terminal of claim 11, wherein a second display screen is displayed in a second region adjacent to the first region in response to the input.

13. The mobile terminal of claim 12, wherein a configuration of a graphical user interface associated with the second display screen is changed based on a size of the second region, the change in configuration of the graphical user interface associated with the second display screen includes at least one of a change in size, shape or content of the graphical user interface.

14. The mobile terminal of claim 13, wherein the graphical user interface for the first display screen includes a plurality of icons for applications on the mobile terminal, and wherein a number of icons displayed in the graphical user interface for the first display screen is changed based on the size of the first region.

15. The mobile terminal of claim 11, wherein the graphical user interface includes at least one of a widget or a gadget.

16. A mobile terminal comprising:
a touchscreen configured to successively display a plurality of display screens each having a corresponding graphical user interface; and
a controller configured to control display of the plurality of display screens on the touchscreen, wherein
a first display screen is displayed in a first region of the touchscreen and a second display screen is configured to replace the first display screen in the first region in response to a first gesture input with the touchscreen,
in response to a second gesture input with the touchscreen, the first display screen is displayed in a second region of the touchscreen and the second display screen is displayed in a third region of the touchscreen, the first and second display screens being displayed concurrently on the touchscreen and the second and third regions being inside the first region, and
at least one of a size, configuration or content of the corresponding graphical user interface for the first and second display screens being changed based on respective sizes of the second and third regions,
wherein the controller is further configured to determine which one of the graphic user interfaces in plural sizes will be displayed on the touchscreen based on at least one of a size and shape of a region of a prescribed graphic user interface included in the display screen displayed on the touchscreen,
wherein the plurality of display screens are configured to be sequentially displayed on the touchscreen in response to a gesture input with the touchscreen,
wherein a duration of the first and second gesture inputs are determined, and
when the duration of the first gesture input is less than a prescribed duration, the first display screen is moved to be replaced by the second display screen, and
when the duration of the second gesture input is greater than or equal to the prescribed duration, a size of the second and third regions are changed and the first graphical user interface is displayed concurrently with a graphical user interface for the second display screen.

17. The mobile terminal of claim 1, wherein the first standby screen includes a plurality of icons displayed as the prescribed graphical user interface for opening corresponding applications.

18. The mobile terminal of claim 1, wherein the controller is further configured to determine which one of the graphic user interfaces in plural sizes will be displayed on the display based on at least one of a size and shape of a region of a prescribed graphic user interface included in the standby screen displayed on the display.

* * * * *